US011607605B1

(12) United States Patent
Garrett

(10) Patent No.: US 11,607,605 B1
(45) Date of Patent: Mar. 21, 2023

(54) TOUCH SCREEN GAME CONTROLLER ASSEMBLY

(71) Applicant: David Garrett, Allen, TX (US)

(72) Inventor: David Garrett, Allen, TX (US)

( * ) Notice: Subject to any disclaimer, the term of this patent is extended or adjusted under 35 U.S.C. 154(b) by 0 days.

(21) Appl. No.: 16/682,620

(22) Filed: Nov. 13, 2019

(51) Int. Cl.
*A63F 13/214* (2014.01)
*A63F 13/24* (2014.01)

(52) U.S. Cl.
CPC ............ *A63F 13/214* (2014.09); *A63F 13/24* (2014.09)

(58) Field of Classification Search
CPC .... A63F 13/214; A63F 13/24; A63F 13/2145; A63F 2300/1043; A63F 2300/1068; A63F 2300/1075
USPC .......................................................... 463/37
See application file for complete search history.

(56) References Cited

U.S. PATENT DOCUMENTS

| D623,649 S | 9/2010 | Claussen | |
|---|---|---|---|
| 8,241,126 B2 | 8/2012 | Ambinder | |
| 9,180,364 B2 | 11/2015 | Pena | |
| 9,690,392 B2 * | 6/2017 | Igarashi | ................. A63F 13/22 |
| 2004/0023719 A1 * | 2/2004 | Hussaini | ................. A63F 13/24 |
| | | | 463/37 |
| 2006/0111180 A1 * | 5/2006 | Cheng | ..................... A63F 13/06 |
| | | | 463/36 |
| 2009/0205878 A1 * | 8/2009 | Taylor | ................. G06F 3/03547 |
| | | | 178/18.03 |
| 2014/0018173 A1 | 1/2014 | Urhman | |
| 2015/0105152 A1 | 4/2015 | Bellinghausen | |
| 2015/0182856 A1 * | 7/2015 | Mays, III | ................ A63F 13/26 |
| | | | 463/31 |
| 2015/0205381 A1 | 7/2015 | Eng | |
| 2019/0291000 A1 * | 9/2019 | Campbell | ............. A63F 13/245 |

FOREIGN PATENT DOCUMENTS

WO   WO2012142265   10/2012

* cited by examiner

*Primary Examiner* — Allen Chan

(57) ABSTRACT

A touch screen game controller assembly includes a game controller that is electronically coupled to a gaming console to control video game play. A direction touch screen is coupled to the game controller for controlling respective control functions of a video game. A button touch screen is coupled to the game controller for controlling respective control functions of a video game. A select touch screen is coupled to the game controller for controlling respective control functions of a video game. A start touch screen is coupled to the game controller for controlling respective control functions of a video game. A first dome and a second dome are each coupled to the game controller for controlling respective control functions of a video game. A first front touch screen and a second front touch screen are each coupled to the game controller for controlling respective control functions of a video game.

7 Claims, 3 Drawing Sheets

TOUCH SCREEN GAME CONTROLLER ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to touch screen devices and more particularly pertains to a new touch screen device for controlling video game play on a gaming console.

BRIEF SUMMARY OF THE INVENTION

An embodiment of the disclosure meets the needs presented above by generally comprising a game controller that is electronically coupled to a gaming console to control video game play. A direction touch screen is coupled to the game controller for controlling respective control functions of a video game. A button touch screen is coupled to the game controller for controlling respective control functions of a video game. A select touch screen is coupled to the game controller for controlling respective control functions of a video game. A start touch screen is coupled to the game controller for controlling respective control functions of a video game. A first dome and a second dome are each coupled to the game controller for controlling respective control functions of a video game. A first front touch screen and a second front touch screen are each coupled to the game controller for controlling respective control functions of a video game.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
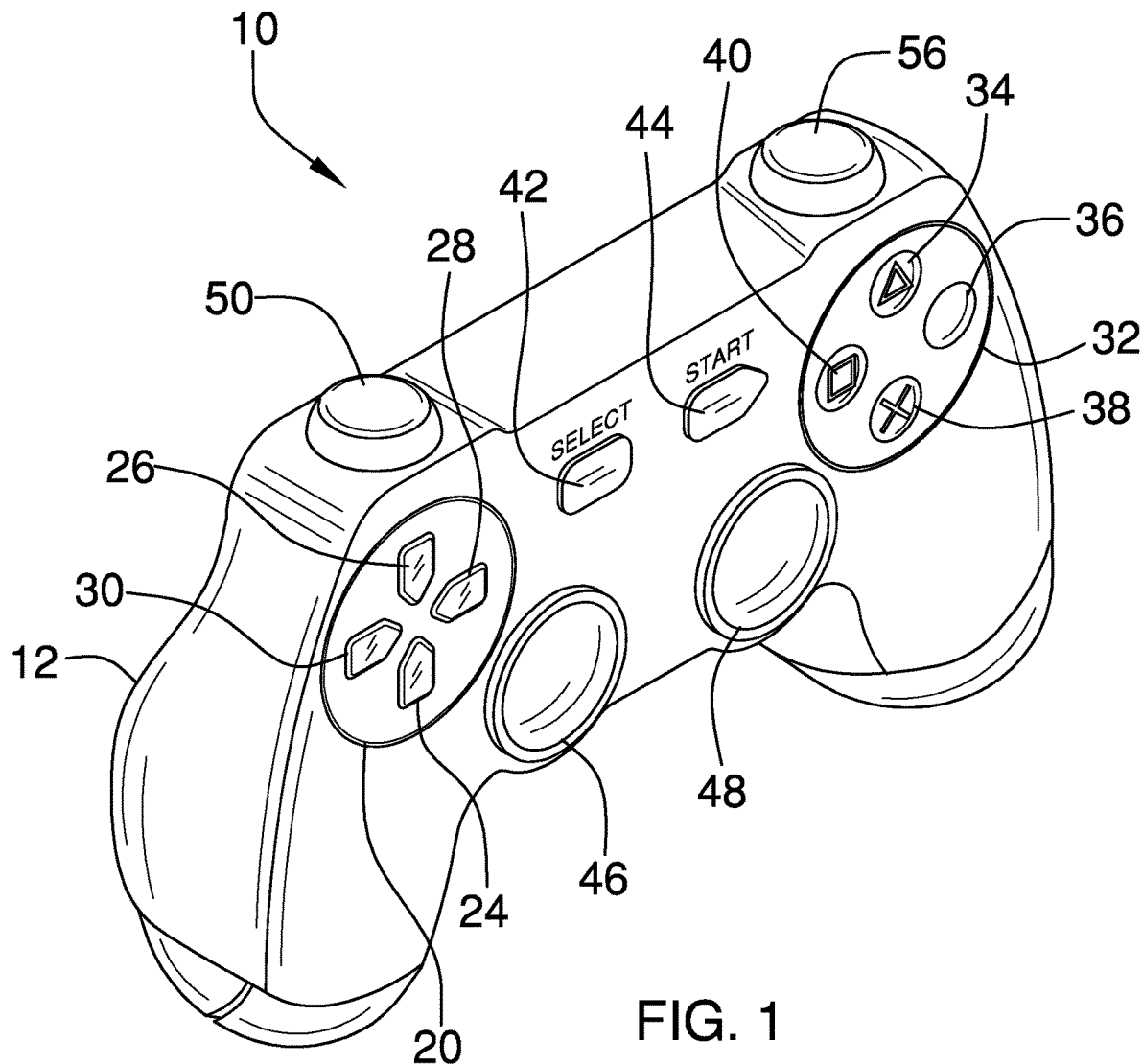
FIG. 1 is a top perspective view of a touch screen game controller assembly according to an embodiment of the disclosure.
Figure 2:
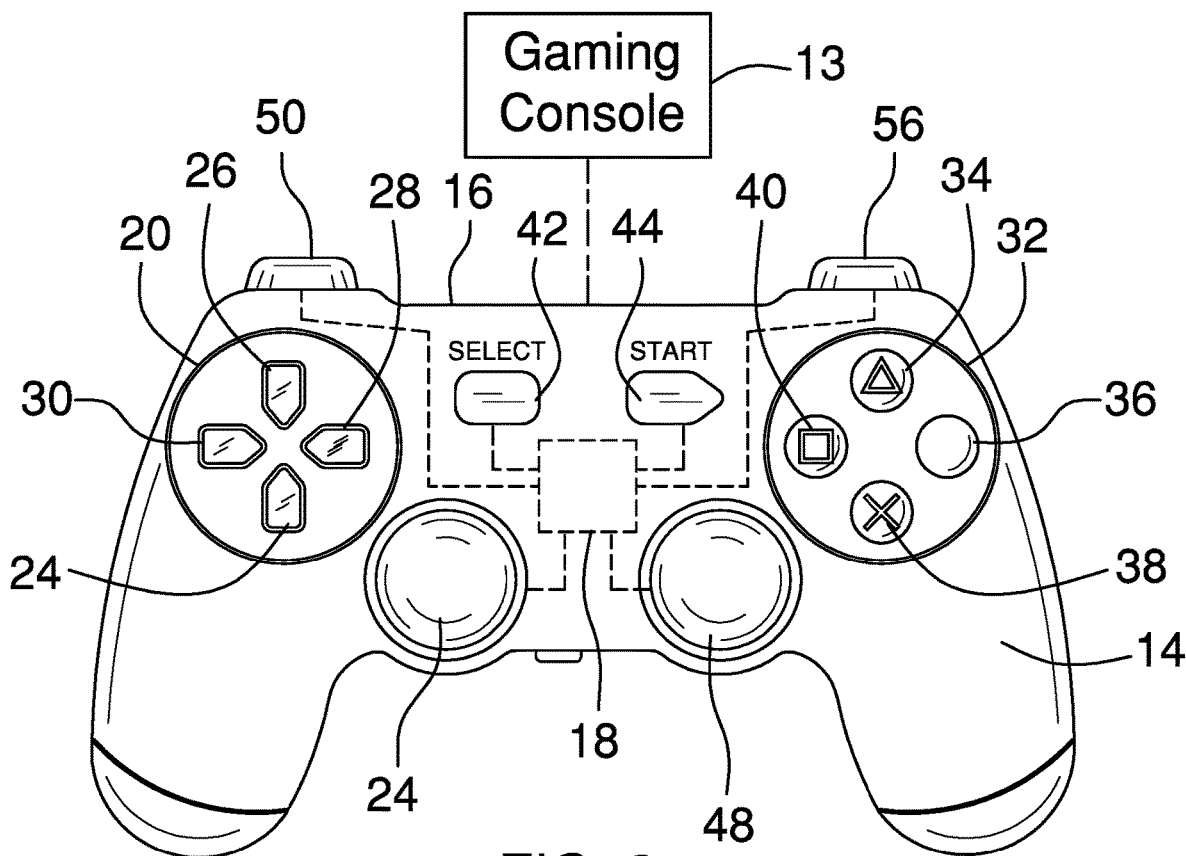
FIG. 2 is a top phantom view of an embodiment of the disclosure.
Figure 3:
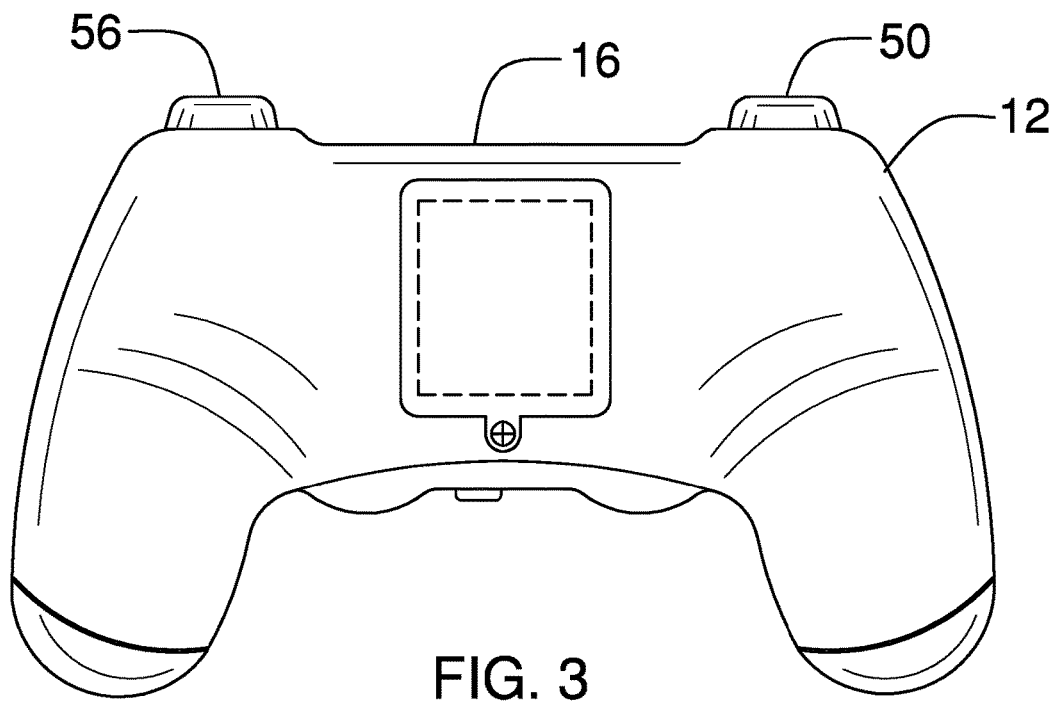
FIG. 3 is a bottom view of an embodiment of the disclosure.
Figure 4:
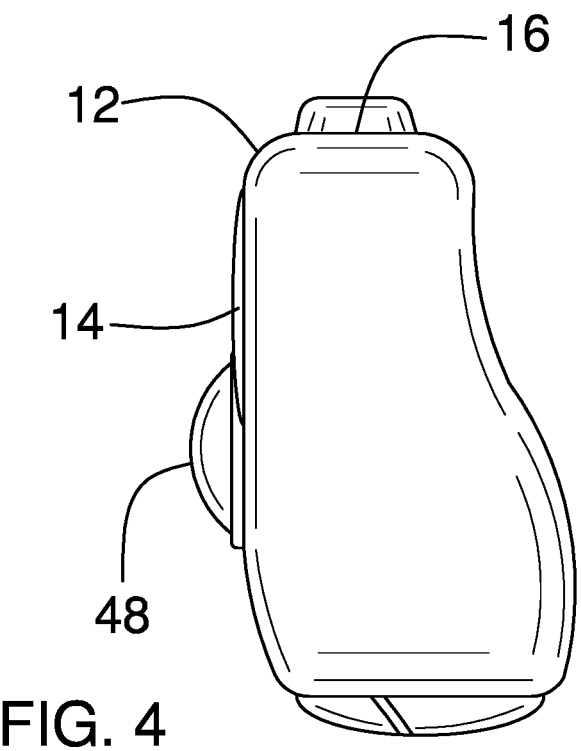
FIG. 4 is a left side view of an embodiment of the disclosure.
Figure 5:
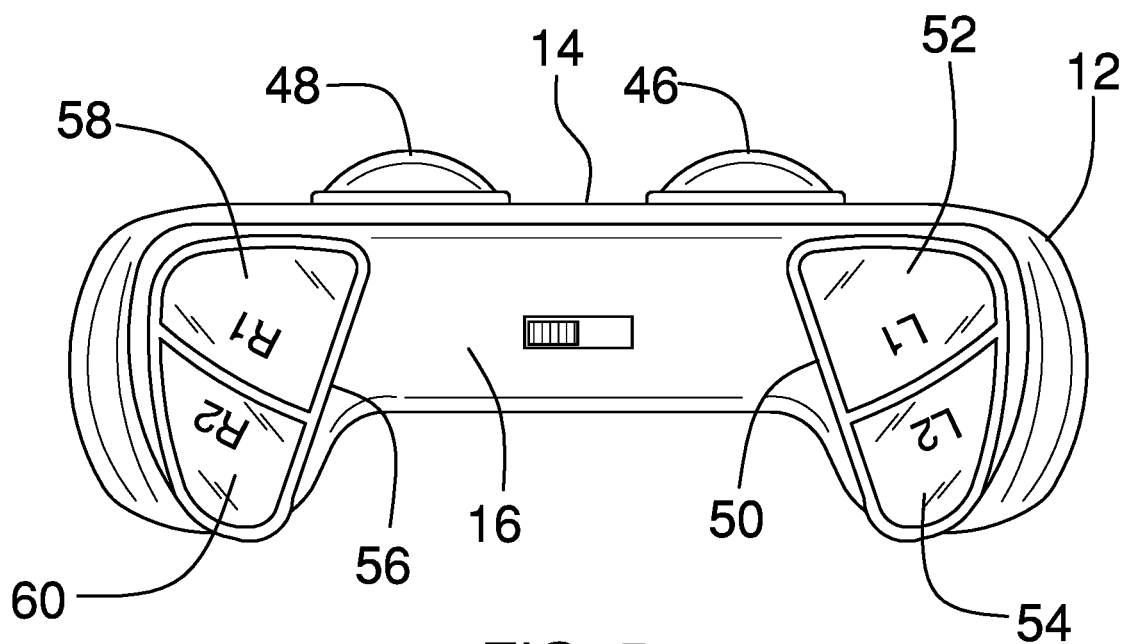
FIG. 5 is a front view of an embodiment of the disclosure.

With reference now to the drawings, and in particular to FIGS. 1 through 5 thereof, a new touch screen device embodying the principles and concepts of an embodiment of the disclosure and generally designated by the reference numeral 10 will be described.

As best illustrated in FIGS. 1 through 5, the touch screen game controller assembly 10 generally comprises a game controller 12 that is electronically coupled to a gaming console 13 to control video game play. The game controller 12 has a top side 14 and a forward side 16, and the game controller 12 may be structured in the style of a Sony PlayStation® game controller, a Microsoft Xbox game controller or any other gaming console 13 manufacturer. A control circuit 18 is coupled to the game controller 12 and the control circuit 18 is in electrical communication with the gaming console 13. The gaming console 13 may be a Sony PlayStation®, a Microsoft Xbox or any other electronic gaming system. The game controller 12 may be a wireless game controller that has a transmitter in electrical communication with the gaming console 13.

A direction touch screen 20 is coupled to the game controller 12 and the direction touch screen 20 responds to touch during the video game play. The direction touch screen 20 is electrically coupled to the control circuit 18. The direction touch screen 20 is positioned on the top side 14 of the game controller 12, and the direction touch screen 20 is positioned adjacent to an intersection between the top side 14 and the forward side 16. The direction touch screen 20 displays indicia comprising an up arrow 24, a down arrow 26, a left arrow 28 and a right arrow 30. Each of the up 24, down 26, left 28 and right 30 arrows is assigned respective control functions by the video game data stored in the gaming console 13. Additionally, each of the up 24, down 26, left 28 and right 30 arrows may have the appearance of direction buttons on existing game controller direction pads.

A button touch screen 32 is coupled to the game controller 12 and the button touch screen 32 responds to touch during the video game play. The button touch screen 32 is electrically coupled to the control circuit 18. The button touch screen 32 is positioned on the top side 14 of the game controller 12 and the button touch screen 32 is positioned adjacent to an intersection between the top side 14 and the forward side 16. Additionally, the direction 20 and button 32 touch screens are on opposite sides of the game controller 12 with respect to each other. The button touch screen 32 displays indicia comprising a triangle button 34, a circle button 36, an X button 38 and a square 40 button. Each of the triangle 34, circle 36, X 38 and square 40 buttons is assigned respective control functions by the video game data stored in the gaming console 13. Moreover, each of the triangle 34, circle 36, X 38 and square 40 buttons may have the appearance of control buttons on existing game controller direction pads.

A select touch screen 42 is coupled to the game controller 12 and the select touch screen 42 responds to touch during the video game play. The select touch screen 42 is electrically coupled to the control circuit 18 and the select touch screen 42 is positioned on the top side 14 of the game controller 12. The select touch screen 42 is positioned between the direction 20 and button 32 touch screens. Additionally, the select touch screen 42 is assigned respective control functions by the video game data stored in the gaming console 13.

A start touch screen 44 is coupled to the game controller 12 and the start touch screen 44 responds to touch during the video game play. The start touch screen 44 is electrically coupled to the control circuit 18 and the start touch screen 44 is positioned on the top side 14 of the game controller 12. Additionally, the start touch screen 44 is positioned between the direction 20 and button 32 touch screens. The start touch screen 44 is assigned respective control functions by the video game data stored in the gaming console 13. Each of the direction 20, button 32, select 42 and start 44 touch screens may comprise a touch sensitive LCD screen or other similar electronic display.

A first dome 46 is coupled to the game controller 12 and the first dome 46 touched during video game play. The first dome 46 is comprised of a touch sensitive material such that the first dome 46 can sense the user's fingers. The first dome 46 is electrically coupled to the control circuit 18 and the first dome 46 is positioned on the top side 14 of the game controller 12. Additionally, the first dome 46 is positioned beneath the select touch screen 42 and the direction touch screen 20. The first dome 46 is assigned respective control functions by the video game data stored in the gaming console 13.

A second dome 48 is coupled to the game controller 12 and the second dome 48 is touched during video game play. The second dome 48 is comprised of a touch sensitive material such that the second dome 48 can sense the user's fingers. The second dome 48 is electrically coupled to the control circuit 18 and the second dome 48 is positioned on the top side 14 of the game controller 12. The second dome 48 is positioned beneath the start touch screen 44 and the button touch screen 32. Additionally, the second dome 48 is assigned respective control functions by the video game data stored in the gaming console 13. Each of the first 46 and second 48 domes may comprise an electronic touch pad that is capable of determining where they are being touched. Additionally, the control circuit 18 translates touch data from each of the first 46 and second 48 domes into a signal that is the same as the signal received from manual video game controls.

A first front touch screen 50 is coupled to the game controller 12 and the first front touch screen 50 responds to touch during the video game play. The first front touch screen 50 is electrically coupled to the control circuit 18 and the first front touch screen 50 is positioned on the front side of the game controller 12. Additionally, the first front touch screen 50 is aligned with the direction touch screen 20. The first front touch screen 50 displays indicia comprising an L1 button 52 and an L2 button 54. Additionally, each of the L1 52 and L2 54 buttons is assigned respective control functions by the video game data stored in the gaming console 13.

A second front touch screen 56 is coupled to the game controller 12 and the second front touch screen 56 responds to touch during the video game play. The second front touch screen 56 is electrically coupled to the control circuit 18 and the second front touch screen 56 is positioned on the front side of the game controller 12. The second front touch screen 56 is aligned with the button touch screen 32 and the second front touch screen 56 displays indicia comprising an R1 button 58 and an R2 button 60. Each of the R1 58 and R2 60 buttons is assigned respective control functions by the video game data stored in the gaming console 13. Each of the first 50 and second 56 front touch screens may comprise a touch sensitive LCD screen or the like.

In use, the game controller 12 is gripped during video game play in the conventional manner of using a video game controller 12. Each of the direction 20, button 32, select 42, start 44, first front 50 and second front 56 touch screens are selectively touched to control functions of the video game play. The video game performs the same responses to the direction 20, button 32, select 42, start 44, first front 50 and second front 56 touch screens as compared to push button game controllers. Additionally, each of the first 46 and second 48 domes is touched with respective user's thumbs during game play and the video game performs the same responses as compared to thumb sticks on video game controllers. In this way the problems associated with sticking buttons or thumb sticks is eliminated with touch screen technology.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A touch screen game controller assembly being configured to respond to touch for controlling video game play, said assembly comprising:
 a game controller being electronically coupled to a gaming console wherein said game controller is configured to control video game play;

a control circuit being coupled to said game controller wherein said control circuit is configured to be in electrical communication with the gaming console;

a direction touch screen being coupled to said game controller wherein said direction touch screen is configured to respond to touch during the video game play, said direction touch screen being electrically coupled to said control circuit for controlling respective control functions of a video game;

a button touch screen being coupled to said game controller wherein said button touch screen is configured to respond to touch during the video game play, said button touch screen being electrically coupled to said control circuit for controlling respective control functions of a video game;

a select touch screen being coupled to said game controller wherein said select touch screen is configured to respond to touch during the video game play, said select touch screen being electrically coupled to said control circuit controlling respective control functions of a video game;

a start touch screen being coupled to said game controller wherein said start touch screen is configured to respond to touch during the video game play, said start touch screen being electrically coupled to said control circuit controlling respective control functions of a video game;

a first dome being coupled to said game controller wherein said first dome is configured to be touched during video game play, said first dome being comprised of a touch sensitive material wherein said first dome is configured to sense the user's fingers, said first dome being electrically coupled to said control circuit controlling respective control functions of a video game;

a second dome being coupled to said game controller wherein said second dome is configured to be touched during video game play, said second dome being comprised of a touch sensitive material wherein said second dome is configured to sense the user's fingers, said second dome being electrically coupled to said control circuit controlling respective control functions of a video game;

a first front touch screen being coupled to said game controller wherein said first front touch screen is configured to respond to touch during the video game play, said first front touch screen being electrically coupled to said control circuit controlling respective control functions of a video game; and a second front touch screen being coupled to said game controller wherein said second front touch screen is configured to respond to touch during the video game play, said second front touch screen being electrically coupled to said control circuit controlling respective control functions of a video game.

2. The assembly according to claim 1, wherein:

said game controller has a top side and a forward side;

said direction touch screen is positioned on said top side of said game controller, said direction touch screen being positioned adjacent to an intersection between said top side and said forward side;

said button touch screen is positioned on said top side of said game controller, said button touch screen being positioned adjacent to an intersection between said top side and said forward side, said direction and button touch screens being on opposite sides of said game controller with respect to each other;

said select touch screen is positioned on said top side of said game controller, said select touch screen being positioned between said direction and button touch screens;

said start touch screen is positioned on said top side of said game controller, said start touch screen being positioned between said direction and button touch screens;

said first dome is positioned on said top side of said game controller, said first dome being positioned beneath said select touch screen and said direction touch screen;

said second dome is positioned on said top side of said game controller, said second dome being positioned beneath said start touch screen and said button touch screen;

said first front touch screen is positioned on said front side of said game controller, said first front touch screen being aligned with said direction touch screen; and said second front touch screen being positioned on said front side of said game controller, said second front touch screen being aligned with said button touch screen.

3. The assembly according to claim 2, wherein said direction touch screen displays indicia comprising an up arrow, a down arrow, a left arrow and a right arrow, each of said up, down, left and right arrows being assigned respective control functions by the video game data stored in the gaming console.

4. The assembly according to claim 2, wherein said button touch screen displays indicia comprising a triangle button, a circle button, an x button and a square button, each of said triangle, circle, x and square buttons being assigned respective control functions by the video game data stored in the gaming console.

5. The assembly according to claim 2, wherein said first front touch screen displays indicia comprising an L1 button and an L2 button, each of said L1 and L2 buttons being assigned respective control functions by the video game data stored in the gaming console.

6. The assembly according to claim 2, wherein said second front touch screen displays indicia comprising an R1 button and an R2 button, each of said R1 and R2 buttons being assigned respective control functions by the video game data stored in the gaming console.

7. A touch screen game controller assembly being configured to respond to touch for controlling video game play, said assembly comprising:

a game controller being electronically coupled to a gaming console wherein said game controller is configured to control video game play, said game controller having a top side and a forward side;

a control circuit being coupled to said game controller wherein said control circuit is configured to be in electrical communication with the gaming console;

a direction touch screen being coupled to said game controller wherein said direction touch screen is configured to respond to touch during the video game play, said direction touch screen being electrically coupled to said control circuit, said direction touch screen being positioned on said top side of said game controller, said direction touch screen being positioned adjacent to an intersection between said top side and said forward side, said direction touch screen displaying indicia comprising an up arrow, a down arrow, a left arrow and a right arrow, each of said up, down, left and right arrows being assigned respective control functions by the video game data stored in the gaming console;

a button touch screen being coupled to said game controller wherein said button touch screen is configured to respond to touch during the video game play, said button touch screen being electrically coupled to said control circuit, said button touch screen being positioned on said top side of said game controller, said button touch screen being positioned adjacent to an intersection between said top side and said forward side, said direction and button touch screens being on opposite sides of said game controller with respect to each other, said button touch screen displaying indicia comprising a triangle button, a circle button, an x button and a square button, each of said triangle, circle, x and square buttons being assigned respective control functions by the video game data stored in the gaming console;

a select touch screen being coupled to said game controller wherein said select touch screen is configured to respond to touch during the video game play, said select touch screen being electrically coupled to said control circuit, said select touch screen being positioned on said top side of said game controller, said select touch screen being positioned between said direction and button touch screens, said select touch screen being assigned respective control functions by the video game data stored in the gaming console;

a start touch screen being coupled to said game controller wherein said start touch screen is configured to respond to touch during the video game play, said start touch screen being electrically coupled to said control circuit, said start touch screen being positioned on said top side of said game controller, said start touch screen being positioned between said direction and button touch screens, said start touch screen being assigned respective control functions by the video game data stored in the gaming console;

a first dome being coupled to said game controller wherein said first dome is configured to be touched during video game play, said first dome being comprised of a touch sensitive material wherein said first dome is configured to sense the user's fingers, said first dome being electrically coupled to said control circuit, said first dome being positioned on said top side of said game controller, said first dome being positioned beneath said select touch screen and said direction touch screen, said first dome being assigned respective control functions by the video game data stored in the gaming console;

a second dome being coupled to said game controller wherein said second dome is configured to be touched during video game play, said second dome being comprised of a touch sensitive material wherein said second dome is configured to sense the user's fingers, said second dome being electrically coupled to said control circuit, said second dome being positioned on said top side of said game controller, said second dome being positioned beneath said start touch screen and said button touch screen, said second dome being assigned respective control functions by the video game data stored in the gaming console;

a first front touch screen being coupled to said game controller wherein said first front touch screen is configured to respond to touch during the video game play, said first front touch screen being electrically coupled to said control circuit, said first front touch screen being positioned on said front side of said game controller, said first front touch screen being aligned with said direction touch screen, said first front touch screen displaying indicia comprising an L1 button and an L2 button, each of said L1 and L2 buttons being assigned respective control functions by the video game data stored in the gaming console; and a second front touch screen being coupled to said game controller wherein said second front touch screen is configured to respond to touch during the video game play, said second front touch screen being electrically coupled to said control circuit, said second front touch screen being positioned on said front side of said game controller, said second front touch screen being aligned with said button touch screen, said second front touch screen displaying indicia comprising an R1 button and an R2 button, each of said R1 and R2 buttons being assigned respective control functions by the video game data stored in the gaming console.

\* \* \* \* \*